No. 797,353. PATENTED AUG. 15, 1905.
J. P. GOODFELLOW & S. R. RAMSAY.
FLUSH VALVE.
APPLICATION FILED JUNE 20, 1904.
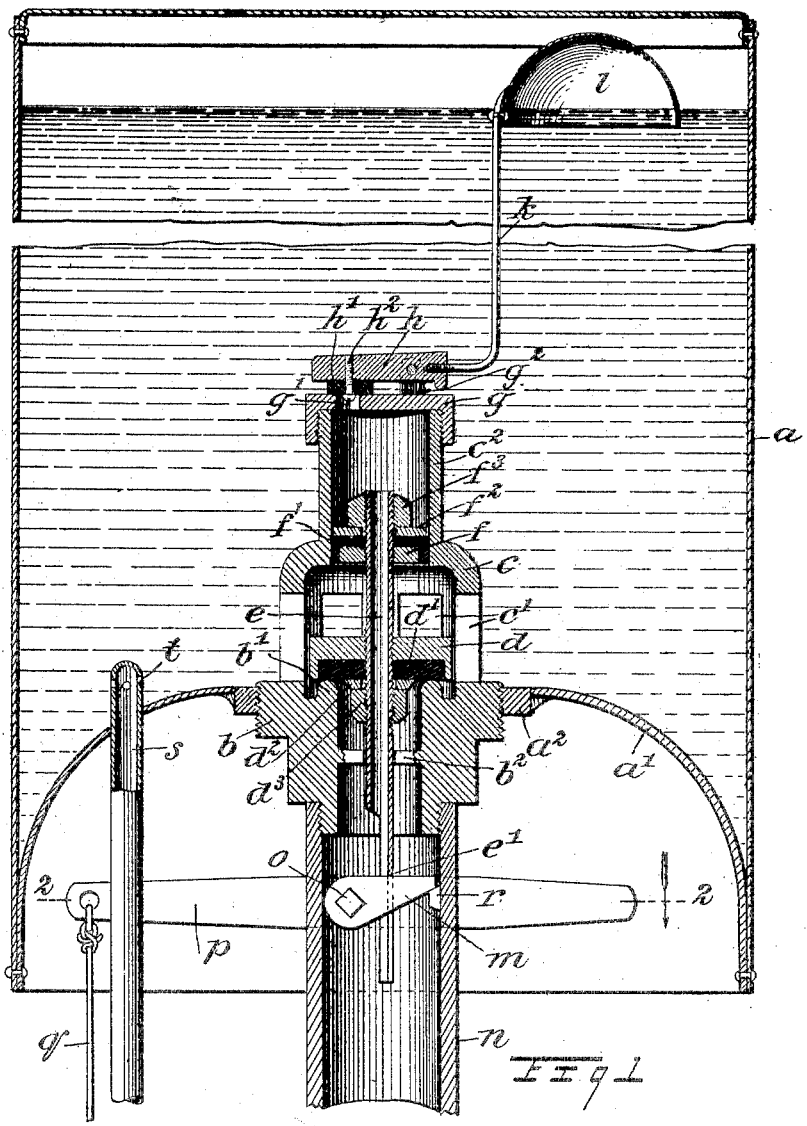
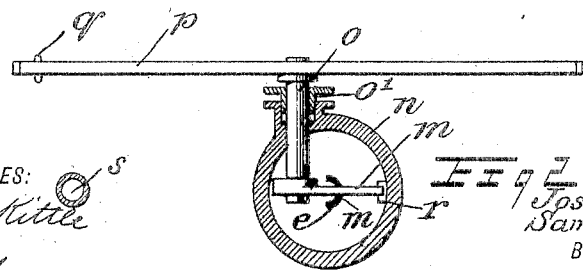
WITNESSES:
John J. Kittle
A. E. Fay
INVENTORS
Joseph P. Goodfellow
Samuel R. Ramsay
BY
ATTORNEYS

UNITED STATES PATENT OFFICE.

JOSEPH PETER GOODFELLOW AND SAMUEL ROBERT RAMSAY, OF NEW WESTMINSTER, CANADA.

FLUSH-VALVE.

No. 797,353.　　　　Specification of Letters Patent.　　　　Patented Aug. 15, 1905.

Application filed June 20, 1904. Serial No. 213,295.

*To all whom it may concern:*

Be it known that we, JOSEPH PETER GOODFELLOW and SAMUEL ROBERT RAMSAY, citizens of the United States of America, and residents of New Westminster, in the Province of British Columbia and Dominion of Canada, have invented a new and Improved Flush-Valve, of which the following is a full, clear, and exact description.

Our invention relates to a flush-valve; and the objects of the invention are to improve the construction of devices of this character in such a manner as to do away with the annoyances of the ball-cocks, floats, and the like now in use, to simplify the construction of such devices, and especially to provide a valve which will be balanced under all pressures.

Further objects of the invention will appear in the course of the subjoined description.

Reference is to be had to the accompanying drawings, forming a part of this specification, in which similar characters of reference indicate corresponding parts in both views.

Figure 1 is a central sectional view of a tank with a preferred form of our invention applied thereto, and Fig. 2 is a sectional view on the line 2 2 of Fig. 1.

In the drawings the tank is represented by $a$, and it is provided with a concave bottom $a'$ and a closed top. The bottom is provided with an opening in which is placed a screw-threaded ring $a^2$ for supporting a nut $b$. The nut is provided with an upwardly-extending case $c$, which has openings $c'$ in its sides for the admission of water from the tank. The nut is also provided with a valve-seat $b'$ for a valve $d$, which is provided with a leather disk $d'$ or equivalent thereof for forming a water-tight joint with the valve-seat.

The casing $c$ is provided at its upper end with a cylinder $c^2$, and the valve $d$ is mounted upon a hollow stem $e$, which, as will be seen later, constitutes a drip-tube. This tube also supports a piston $f$, which is provided with a cup-shaped leather disk $f'$ for making a water-tight joint and is also provided with a washer $f^2$ and a nut $f^3$ for securing the parts in position on the drip-tube. The valve $d$ is secured in position by means of a washer $d^2$ and a nut $d^3$ in the same manner.

The upper part of the cylinder $c^2$ is closed by means of a cap $g$ and a valve $h'$, which is adapted to seat upon and close an opening $g'$ in the cap. The valve is mounted upon a plate $h$, pivoted to standards $g^2$ projecting upwardly from the cap, and the valve is secured to the pivoted plate by means of a screw $h^2$ or the like. Extending upwardly from the plate $h$ is a rod $k$, upon the upper end of which is secured a hollow, spherical, or other shaped float $l$.

The lower part of the drip-tube $e$ is guided in the nut $b$ by means of projections $b^2$ and is provided with a slot $e'$ in its extreme lower end in which works a lever $m$. This lever $m$ is preferably contained within a waste-pipe $n$ and is mounted upon a shaft $o$, which passes through the wall of the waste-pipe and is provided with a stuffing-box $o'$. Upon the outer end of the shaft is a lever $p$, to which is secured a rope or chain $q$ for operating the valve.

$r$ is a stop in the waste-pipe for preventing the lever $m$ from turning too far.

$s$ is a feed-pipe for the tank and preferably extends therein through the bottom $a'$ and is provided with openings $t$, the combined area of which may be greater than the area of the opening $g'$, as will be seen later, or the area of the opening $g'$ may be a little greater than that of the passage in the drip-tube $e$.

It will be seen that on account of the closing of the opening $g'$ when the water reaches a high enough level to force the float $l$ to its highest position and the admission of water through the openings $c'$ into the interior of the casing $c$ and allowing it to press upon the lower surface of the piston $f$ and the upper surface of the valve $d$, which is slightly larger than the former, a perfectly-balanced valve will be secured, and it will be balanced whatever the pressure of the water in the tank. It will thus be seen that the functions of the piston $f$ are to exert a lifting force on the valve $d$, to balance it when closed, and also to lift it up by means of the pressure of the water on its lower surface when the valve $d$ is sufficiently raised to destroy the balance of pressure by admitting water underneath it.

Although we have described a particular embodiment of our invention, it will be obvious that many modifications may be made therein and that the invention may be embodied in many other forms. We do not wish to limit ourselves to the exact construction shown and described, but desire protection for the principle of our invention as set forth in the appended claims.

The operation of the device illustrated in the drawings will now be described. As the water enters the tank through the openings $t$ it will rise to the level of the top of the cap $g$, the air passing out through the opening $g'$; but upon the entrance of more water than can pass through the opening $g'$ the tank will be gradually filled above this point, and the air entrapped above the water will be compressed until it reaches a pressure equal to that of the source of the system. When it reaches a high enough level to float the shell $l$, the opening $g'$ will be closed by the valve $h'$ and no more water will be permitted to flow into the cylinder $c^2$ and through the drip-tube $e$. At this point the parts are all in the position shown in Fig. 1. If now the lever $p$ is tripped by means of a pull on the chain $q$, the lever $m$ will be raised slightly, carrying with it the drip-tube $e$ and with it the valve $d$ and piston $f$. As soon as the valve $d$ is unseated the balance of pressure between the valve and piston will be destroyed and there will be no force except the force of gravity acting upon the valve $d$ to cause it to move upwardly or downwardly. Therefore the pressure of water against the bottom of the piston $f$ will force it up in the cylinder $c^2$, the air in the cylinder escaping through the drip-tube $e$. It will be seen from this that as soon as the valve is unseated no further force on the chain $q$ will be required to move the valve to its uppermost position. When this is accomplished, the water will rapidly flow in through the pipe $s$, and as soon as it is lowered sufficiently to allow the shell $l$ to fall back and swing the plate $h$ on its pivot, so as to unseat the valve $h'$, water will be permitted to flow through the opening $g'$ into the cylinder $c^2$ and out through the drip-tube. When the water reaches a level below the bottom of the piston $f$, the force holding the valve $d$ up away from its seat will be removed, and consequently the valve will settle back to its seat by gravity. During all this time water will of course enter the tank through the openings $t$, which are not affected in any manner by these various operations. As soon as the valve $d$ is seated the tank will commence to fill up and the cycle of operations described will be repeated.

It will be observed that the opening $g'$ constitutes a passage for refilling the bowl after flushing. It will also be seen that all the parts of the device are located in the concave bottom, where they cannot be readily tampered with and where they will be out of sight and yet will not be in the water-tank itself. It will also be seen that the valve is perfectly balanced under any pressure without the aid of floats, weights, or springs; that the whole device is composed of few parts and that but slight force is required to operate it; that it can be removed from the tank readily without disturbing the tank or any other parts, and that it may be used on the tank in any position whatever, either high or low; that the device is very economical in the consumption of water, and that it has many other points of utility.

Having thus described our invention, we claim as new and desire to secure by Letters Patent—

1. The combination with a flush-tank having an outlet, of a valve for said outlet, a cylinder having an inlet, a piston in the cylinder, a tube rigidly connecting the piston with said valve and constituting an outlet for the cylinder through the piston and valve, a second valve for said inlet, said second valve being movably connected to said cylinder, and means for automatically operating said second valve independently of the first-mentioned valve.

2. A valve device comprising a casing having a seat, a valve adapted to coact with said seat, a cylinder having an inlet and an outlet discharging through the valve, a piston in said cylinder rigidly connected with said valve, a valve for said inlet, and means for operating said last-named valve.

3. A valve device comprising a valve proper, a cylinder having an inlet and an outlet above the valve, a second valve for closing and opening said inlet, said second valve being pivotally connected to said cylinder, and means for operating said second valve comprising a float said means being independent of the first valve.

4. A valve device comprising a valve proper, a piston rigidly connected thereto, a cylinder for said piston having an inlet, a valve for the inlet a waste-pipe, and a drip-tube passing through said piston and first-mentioned valve and constituting an outlet for said cylinder and terminating in said waste-pipe.

5. A valve device comprising a valve-casing having a seat and openings through its walls, a valve adapted to rest on said seat, and having an upper surface for the reception of pressure from liquid in the casing, a perforated piston rigidly connected with the valve, and a cylinder for said piston having an open end whereby pressure on the valve is balanced by pressure upon the piston in the cylinder.

6. A valve device comprising a seat, a valve, a drip-tube, passage through the valve, means for adjustably securing said valve to said tube, the said tube-cylinder above the valve, a piston in the cylinder and secured to the drip-tube, said piston having a lower surface of smaller area than the upper surface of the valve, and open to the pressure of liquid in the device having a slot, a lever engaging said tube in the slot, and means for operating said lever to unseat the valve.

7. A valve device comprising a valve-casing having a seat and openings through its walls, a valve adapted to engage said seat and having an upper surface for the reception of pressure, a perforated piston rigidly connected with the valve, a cylinder for said piston having an open end whereby pressure on the valve is balanced by upward pressure upon the piston in the cylinder, and a hollow tube rigidly connecting said valve and piston and passing through both, the upper end of said tube terminating within said cylinder and the lower end below said valve.

8. The combination with a flush-tank, of an inlet-pipe therefor having openings, a valve-casing having a valve-seat located on the bottom of the tank, and said casing projecting into the tank, a cylinder on said casing having an open lower end opposite said valve-seat, and an inlet of smaller area than the combined area of the openings in said pipe, a piston in said cylinder, and a valve in the casing adapted to engage said seat and rigidly connected with said piston.

9. The combination with a flush-tank having a closed top, of an inlet-pipe therefor having openings, a valve-casing having a valve-seat located on the bottom of the tank and projecting into the tank, a cylinder on said casing having an open lower end and an inlet of smaller area than the combined area of the openings in said pipe, a perforated piston in said cylinder, a perforated valve in the casing adapted to engage said seat, and a drip-tube rigidly secured in the perforations of the cylinder and valve and extending through the valve below the bottom of the tank.

10. The combination with a flush-tank having a closed top, of an inlet-pipe therefor having openings, a valve-casing having a valve-seat located on the bottom of the tank and projecting into the tank, a cylinder on said casing having an open lower end and an inlet of smaller area than the combined area of the openings in said pipe, a perforated piston in said cylinder, a perforated valve in the casing adapted to engage said seat, a drip-tube rigidly secured in the perforations of the cylinder and valve and extending through the valve below the bottom of the tank, a lever pivoted below the tank, and an arm connected with the lever adapted to engage the drip-tube for moving the piston and valve.

11. The combination with a flush-tank having a closed top, of an inlet-pipe therefor having openings in the tank, a valve-casing having a valve-seat and projecting into the tank, a cylinder on said casing having an open lower end and an inlet of smaller area than the combined area of the openings in said pipe, a pivoted valve for the inlet in the cylinder, a float for controlling said valve, a perforated piston in said cylinder, a perforated valve in the casing adapted to engage said seat, a drip-tube secured in the perforations of the piston and valve and extending through the valve below the bottom of the tank, and a waste-pipe into which the valve-casing and cylinder are adapted to discharge the latter through the drip-tube.

12. The combination with a flush-tank having a closed top and a concave bottom, of an inlet-pipe therefor entering said bottom and having openings, a valve-casing having a valve-seat located at the upper part of the bottom and projecting into the tank therefrom, a cylinder on said casing having an open lower end and an inlet of smaller area than the combined area of the openings in said pipe, a pivoted valve for the inlet in the cylinder, a float in the tank for controlling said last-mentioned valve, a perforated piston reciprocably mounted in said cylinder, a perforated valve movably mounted in the casing and adapted to engage said seat in the casing, a drip-tube rigidly secured in the perforations of the piston and valve and extending through the valve below the bottom of the tank, a waste-pipe into which the valve-casing and cylinder are adapted to discharge the latter through the drip-tube, a lever pivoted to the waste-pipe, and an arm connected with the lever and adapted to engage the drip-tube for moving the piston and valve.

In testimony whereof we have signed our names to this specification in the presence of two subscribing witnesses.

JOSEPH PETER GOODFELLOW.
SAMUEL ROBERT RAMSAY.

Witnesses:
F. W. HOWAY,
R. L. REID.